United States Patent
Wang et al.

(10) Patent No.: US 9,065,641 B2
(45) Date of Patent: Jun. 23, 2015

(54) METHOD AND DEVICE FOR UPDATING A KEY

(75) Inventors: Zhengwei Wang, Shenzhen (CN); Yingxin Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1316 days.

(21) Appl. No.: 11/921,203

(22) PCT Filed: May 26, 2006

(86) PCT No.: PCT/CN2006/001113
§ 371 (c)(1),
(2), (4) Date: Nov. 28, 2007

(87) PCT Pub. No.: WO2006/128364
PCT Pub. Date: Dec. 7, 2006

(65) Prior Publication Data
US 2010/0064344 A1    Mar. 11, 2010

(30) Foreign Application Priority Data
May 28, 2005    (CN) .......................... 2005 1 0034969

(51) Int. Cl.
    *B41B 11/00*    (2006.01)
    *H04L 9/08*    (2006.01)
    (Continued)

(52) U.S. Cl.
    CPC ............. *H04L 9/0891* (2013.01); *H04W 12/04* (2013.01); *H04W 12/06* (2013.01); *H04L 2209/80* (2013.01)

(58) Field of Classification Search
    CPC ......... H04L 63/08; H04L 63/20; H04L 29/06; H04L 63/0428
    USPC .............................................. 726/3
    See application file for complete search history.

(56) References Cited

U.S. PATENT DOCUMENTS 6,853,729 B1 * 2/2005 Mizikovsky .................. 380/249
6,957,061 B1 * 10/2005 Wright .......................... 455/411
(Continued)

FOREIGN PATENT DOCUMENTS

| CN | 1283906 | 2/2001 |
| CN | 1457173 A | 11/2003 |

(Continued)

OTHER PUBLICATIONS

Simjan B Mizikofsky, "Method and device for replacing secret keys by two-way confirmation", Publication No. 1283906, Feb. 14, 2001, pp. 1-21 (Machine Translation).*

(Continued)

*Primary Examiner* — Luu Pham
*Assistant Examiner* — Canh Le
(74) *Attorney, Agent, or Firm* — Slater & Matsil, L.L.P.

(57) ABSTRACT

A method for updating a key includes: assigning, by a network, a stipulated specific value to an authentication management field AMF and generating a corresponding authentication tuple, and sending corresponding parameters in the authentication tuple to the terminal when an authentication request is initiated to the terminal, and generating a new authentication key for use in the next authentication; generating, by the terminal, a new authentication key corresponding to the network for use in the next authentication, when the corresponding parameters are received and it is determined that the authentication for the network is passed and the authentication management field in the corresponding parameters is with the predetermined value. According to the method for updating the key according to the invention, the key may be updated conveniently without adding to or modifying the existing signaling resources or the authentication parameters, so that network security may be improved.

16 Claims, 5 Drawing Sheets

(51) Int. Cl.
*H04W 12/04* (2009.01)
*H04W 12/06* (2009.01)

(56) References Cited

U.S. PATENT DOCUMENTS

| | | | |
|---|---|---|---|
| 2003/0220107 A1* | 11/2003 | Lioy et al. | 455/435.1 |
| 2004/0078571 A1* | 4/2004 | Haverinen | 713/168 |
| 2004/0102181 A1* | 5/2004 | Horn | 455/410 |
| 2005/0216441 A1* | 9/2005 | Thomas et al. | 707/1 |
| 2005/0272406 A1* | 12/2005 | Mizikovsky et al. | 455/411 |
| 2006/0079205 A1* | 4/2006 | Semple et al. | 455/411 |
| 2006/0087982 A1* | 4/2006 | Kuure et al. | 370/252 |
| 2006/0121895 A1* | 6/2006 | Zou et al. | 455/433 |
| 2006/0171541 A1* | 8/2006 | Horn et al. | 380/278 |

FOREIGN PATENT DOCUMENTS

| | | |
|---|---|---|
| CN | 1549482 | 11/2004 |
| GB | 2 356 530 A | 5/2001 |

OTHER PUBLICATIONS

Zou Fengshao et al, "Method for realizing high rate group data service identification", Publication No. 1549482, Nov. 24, 2004, pp. 1-18 (Machine Translation).*

Geir M. Koien et al., "An Introduction to access security in UMTS", IEEE wireless communication, Feb. 2004 pp. 8-18.*

Lein Harn et al. , "On the Security of Wireless Network Access with Enhancements," ACM , 2003 , pp. 88-95.*

English Abstract of CN1283906 dated Feb. 14, 2001.
English Abstract of CN1549482 dated Nov. 24, 2004.
ETSI TS 133 102 Technical Specification Universal Mobile Telecommunications System 3G Security architecture (3GPP TX 33.102 version 6.3.0 Release 6).
Written Opinion of the International Searching Authority dated Aug. 31, 2006 in respect of International Application No. PCT/CN2006/001113.
EP Office Action dated Apr. 29, 2009 in respect of corresponding EP Patent Application No. 06742001.8.
EP Office Action dated Feb. 22, 2010 in respect of corresponding EP Patent Application No. 06742001.8.
Chinese Office Action dated Jan. 4, 2008 in respect of Chinese Priority Application No. 200510034969.1 (with partial English translation).
Rejection Decision dated Feb. 5, 2010 in respect of Chinese Priority Application No. 200510034969.1 (with partial English translation).
Partial Translation of CN 1283906A.
Yao, Hui-ming, et al., "The Designs for the 3GPP Authentication and Key Generation Functions", *Journal of Beijing University of Posts and Telecommunications*, vol. 25, No. 3, Sep. 2002, pp. 98-102.
espacenet English abstract of CN 1457173 A.
Third Chinese Office Action and Partial Translation received in Chinese Patent Application No. 200510034969.1, mailed Aug. 21, 2009, 14 pages.
Hearing Notice in Reference of Application No. 2171/MUMNP/2007 received in Patent Office Intellectual Property India, mailed Dec. 10, 2012, 4 pages.
Indian Office Action, Indian Application No. 2171/MUMNP/2007, Dated: Sep. 19, 2011, 2 pages.

* cited by examiner

METHOD AND DEVICE FOR UPDATING A KEY

This application is a national phase filing under section 371 of International Application No. PCT/CN2006/001113, filed on May 26, 2006, which claims priority to Chinese Patent Application No. 200510034969.1, filed on May 28, 2005.

FIELD OF THE INVENTION

The present invention relates to communication security technology, in particular, to a method and device for updating a key.

BACKGROUND OF THE INVENTION

In Global System for Mobile Communications (GSM) network and Wideband Code Division Multiple Access (WCDMA) network, authentication is realized synergically by Mobile station (MS), Mobile Switching Center/Visit Location Register (MSC/VLR) or Serving GPRS Support Node (SGSN), and Home Location Register/Authentication center (HLR/AUC). An authentication key KI is stored in a Subscriber Identity Module (SIM) card or a UMTS Subscriber Identity Module (USIM) card. The HLR/AUC also contains an authentication key KI, the value of which is consistent with the value of the KI in the SIM card or the USIM card. An authentication parameter is computed by the MS and the AUC respectively, and compared by the MSC/VLR or the SGSN. Therefore, the validity of the MS may be verified by the network.

In the authentication in a $3^{rd}$ Generation (3G) system, such as Universal Mobile Telecommunication System (UMTS), an authentication quintuplet is used, and the mobile terminal and the network authenticate each other; and the mobile terminal and the network both store the authentication key KI.

The authentication quintuplet generated by the network includes: a random challenge RAND, an expected response XRES, a cipher key CK, an integrity key IK and an authentication token AUTN. This quintuplet is used by the terminal subscriber card USIM and the network to authenticate each other. The authentication token AUTN is 16 bytes in length and comprises: 1) SQNHE^ AK, in which the sequence number SQNHE and the anonymity key AK are 6 bytes in length respectively; the USIM will check whether the SQNHE generated by the AUC is up to date, which is an important part of the authentication process; 2) an authentication management field AMF, which is 2 bytes in length; 3) a message authentication code MAC-A, which is 8 bytes in length and used to verify the data integrity of the RAND, SQN HE and AMF, and is used by the USIM to authenticate the network.

In addition, to authenticate the USIM via the network during resynchronization, the USIM sends a message authentication code MAC-S to the network.

By means of the aforementioned authentication method, the security of the network may be improved. But, similar to the $2^{nd}$ Generation (2G) communication network, the keys KI stored in the HLR/AUC and the USIM are usually constant, so it will bring about some hidden troubles to the security. For example, if a USIM is cloned, the subscriber cloned may suffer a loss due to free calls on the subscriber's expense through illegal means by a cloner; the service provider may also suffer a loss. For example, the call charge as a reward to one subscriber may be used by two individuals. In another example, in order to reduce operation cost, some service providers entrust a card manufacturer to manufacture a batch of USIM cards and write corresponding data including KI into the subscriber card in advance. If the KI data of these USIM cards divulge from the card manufacturer, it may also cause hidden troubles to the security.

In addition, during the network-locked terminal-lease process, handset manufacturers need to set an initial security key IKey in a User Equipment (UE) and store the IKey on the network; the mobile terminal authenticates the validity of the network according to this IKey, so as to ensure security of the mobile terminal. In such a case, problems also exist. For example, IKey may divulge from handset manufacturers passively, such as, being carried over and brought to light by vicious employees, or being embezzled by hackers. In the aforementioned cases, if the key is not updated, the network may face a great threat to security.

Therefore, it has become an urgent problem that how the key can be updated conveniently so as to improve the network security without modifying the existing communication protocols, adding signaling or authentication parameters and increasing the operation cost.

SUMMARY OF THE INVENTION

In view of the aforementioned technical problem, it is an object of the present invention to provide a method and a device for updating the key, by means of which the key can be conveniently updated and no additional communication protocol, signaling or authentication parameter is required. Therefore, the network security can be improved.

The invention provides a method for updating the key, which includes: a) assigning a predetermined value to the authentication management field AMF via the network and generating a corresponding authentication tuple, sending corresponding parameters in the authentication tuple to a terminal, and generating a new authentication key; b) generating a new authentication key corresponding to the network when the terminal receives the corresponding authentication parameters and determines that the authentication for the network is passed and the authentication management field AMF in the corresponding parameters is with the predetermined value.

Preferably, the Step b further includes: sending a message about successful update of the key to the network via the terminal after it generates the new authentication key.

In a preferred implementation, the process of sending the message about successful update of the key is realized by returning a synchronization request message to the network and assigning a stipulated specific value to the sequence number SQNMS.

Preferably, the method further includes: sending a request for updating the key to the network via the terminal before the Step a.

Preferably, the authentication tuple includes a random challenge RAND, an expected response XRES, a cipher key CK, an integrity key IK and an authentication token AUTN; during the generation of the corresponding authentication tuple, only the RAND and the AUTN may be generated, or the RAND, AUTN and only any one or more of the XRES, CK and IK may be generated.

The invention resolves the aforementioned technical problem with another solution as follows:

a method for updating the key, which includes at least the following steps: a) assigning a predetermined value to the authentication management field AMF via the network and generating a corresponding authentication tuple, sending corresponding parameters in the authentication tuple to a terminal; b) generating a new authentication key corresponding to the network and returning a message about successful update of the key via the terminal when the terminal receives the corresponding parameters and determines that the is authentication for the network is passed and the authentication management field AMF in the corresponding parameters is the predetermined value; c) generating a new authentication key via the network after it receives the message about successful update of the key returned by the terminal.

Preferably, the process of returning a message about successful update of the key in the Step b is realized by returning the sequence number SQNMS with the stipulated specific value when a synchronization request message is returned to the network.

Preferably, the method further includes sending a request for updating the key to the network by the terminal before the Step a.

Preferably, the authentication tuple includes a random challenge RAND, an expected response XRES, a cipher key CK, an integrity key IK and an authentication token AUTN; during the generation of the corresponding authentication tuple, only the RAND and the AUTN may be generated, or the RAND, AUTN and only any one or more of the XRES, CK and IK may be generated.

The invention provides another method for updating the key, which includes:
    sending parameters including at least a random challenge and an authentication token to a terminal via the network, wherein the authentication management field in the authentication token is a predetermined value;
    generating a new authentication key via the terminal according to the random challenge after the authentication for the network with the authentication token is passed; and
    generating a new authentication key via the network according to the random challenge.

The method further includes: sending a request for updating the key to the network via the terminal before sending parameters including at least a random challenge and an authentication token to the terminal via the network.

Wherein, sending a request for updating the key is realized by initiating is a synchronization process to the network; or, via short message or Unstructured Supplementary Data Service or Over-the-Air (OVA).

Wherein, the parameters including at least the random challenge and the authentication token are sent when the network sends an authentication request to the terminal.

The method further includes sending a message indicating the execution result of key update to the terminal and the message indicating the execution result of key update includes message about successful update of the key and message about failed update of the key.

Wherein, the sending of the message indicating the execution result of key update is performed when a synchronization process is initiated to the network; or it is realized via short message, Unstructured Supplementary Data Service and/or Over-the-Air (OVA).

Wherein, the synchronization process is a process for synchronizing the sequence number; and the sequence number having a predetermined value is sent when the synchronization request message is sent.

Wherein, the process of generating a new authentication key via the network according to the random challenge is performed after the message about successful update of the key returned by the terminal is received, or before the parameters including at least the random challenge and the authentication token are sent to the terminal.

The method further includes generating an authentication tuple with the new authentication key via the network after it receives the message about successful update of the key returned by the terminal.

The method further includes: determining whether the location of the terminal is updated by the network before it receives the message about successful update of the key returned by the terminal; if it is updated, the network generates the authentication tuple with the new authentication key; otherwise, the new authentication key is not used when an authentication tuple is generated.

The method further includes: determining whether an old authentication tuple still exists on the network when the network generates the authentication tuple with the new authentication key; if it still exists, the old authentication tuple will be deleted.

The method further includes generating an authentication tuple with the new authentication key via the network.

Wherein, the parameters further include any one or more of the expected response, the cipher key and the integrity key.

The invention provides another method for updating the key, which includes:
    sending parameters including at least a key generation reference and an authentication token to a terminal via the network, the authentication token carries a key update identification;
    generating a new authentication key according to the key generation reference via the terminal after the authentication for the network with the authentication token is passed; and
    generating a new authentication key via the network according to the key generation reference.

The invention further provides a device for updating the key, which includes:
    a first unit, which is set on the network for assigning a predetermined value to the authentication management field when the key needs to be updated, generating a corresponding authentication tuple, and generating a new authentication key; and
    a second unit, which is set on the network for sending corresponding parameters in the authentication tuple to the terminal.

The device further includes a third unit, set on the network for generating a new authentication tuple with the new authentication key.

The invention further provides a device for updating a key, the device is set on the terminal and includes:
    a first unit, for determining whether the authentication for the network is passed and determining whether the authentication management field in corresponding parameters is with a predetermined value, after the corresponding parameters from the network are received; and
    a second unit, for generating a new authentication key corresponding to the network when the authentication for the network is passed and the authentication management field in the corresponding parameters is with the predetermined value.

The device further includes: a third unit, for sending a message about successful update of the key to the network after the new authentication key is generated.

In summary, according to the method for updating a key of the invention, the authentication management field takes a predetermined value, and the key will be updated when the authentication for the network by the terminal is passed and the authentication management field takes the predetermined value. Therefore, the existing signaling resources or the authentication parameters do not need to be added or modified, so that the key may be updated conveniently and network security may be improved.

DETAILED DESCRIPTION OF THE EMBODIMENTS

Figure 1:
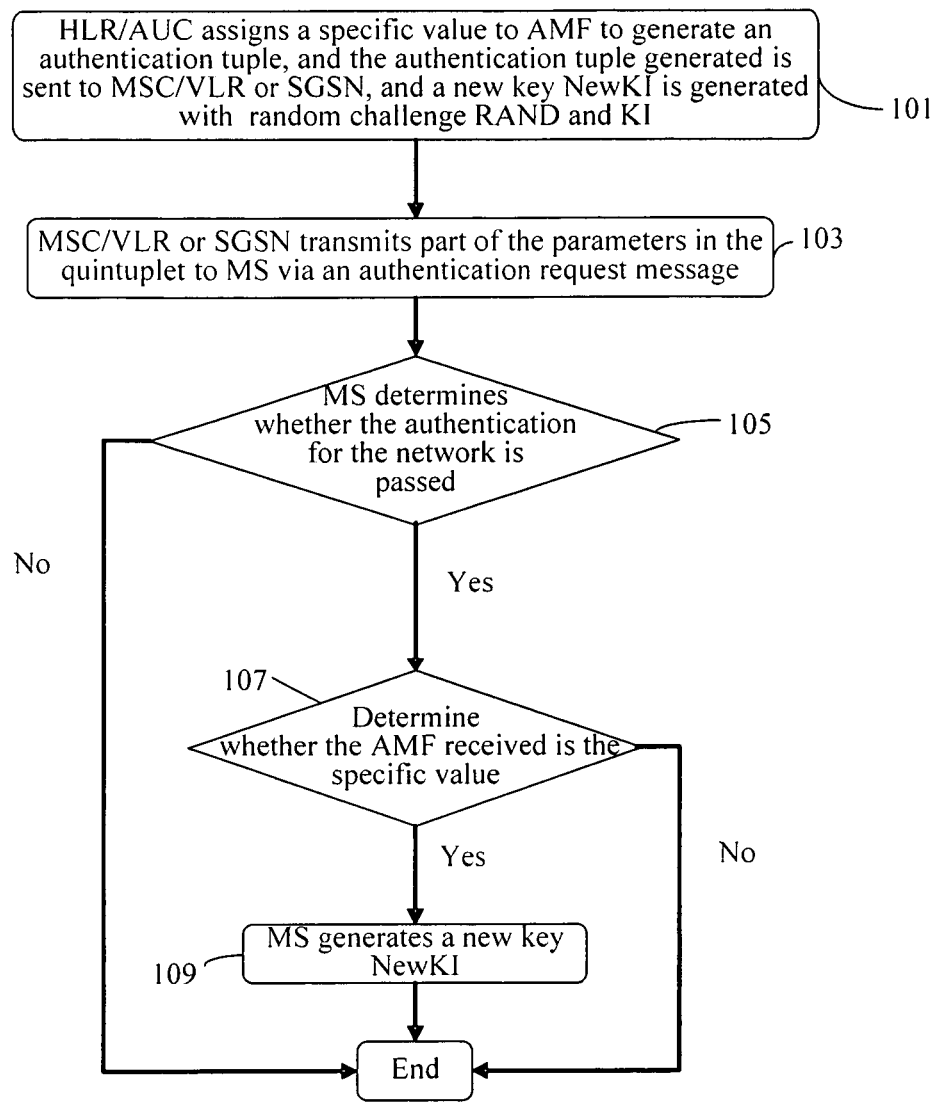
FIG. 1 is a flow chart of the method for updating the key according to the first implementation of the invention.

According to the method for updating the key according to the invention, when an authentication key KI needs to be updated, a stipulated specific value is assigned to the authentication management field AMF by the network and a corresponding authentication tuple is generated, and the corresponding parameters in the authentication tuple are sent to a terminal; and a new authentication key NewKI is generated by use of the random challenge RAND and the KI generated, and the NewKI is used in place of KI to generate an authentication tuple for the next time. After the terminal receives the authentication request and determines that the authentication at network is passed, it determines whether the AMF is the specific value. If No, proceed as in a normal process; otherwise, it determines that the key needs to be updated, and a new authentication key NewKI is generated by use of the received random challenge RAND and the stored authentication key KI, and the new authentication key NewKI is used in place of KI in the next authentication for authenticating the validity of the network or responding to the authentication request from the network.

After the key is updated by the terminal, it may further send a message indicating the execution result of key updating to the network, so that the network knows whether the key update operation is executed successfully or not. The message indicating the execution result of key updating may be message about successful update of the key and/or message about failed update of the key, etc. The message indicating the execution result of key updating may be obtained by a synchronization request message. For example, after the authentication for the network via the terminal is passed and the key update operations such as new key generation is executed, a synchronization request message may be sent, and in combination with the authentication key KI and the random challenge RAND, a stipulated specific value may be used in place of the sequence number SQNMS to generate a resynchronization token AUTS which is returned to the network. When the network processes the synchronization request message, it determines whether the sequence number SQNMS received has the stipulated specific value. If No, the procedure is as in a normal process; otherwise, the network determines whether the key is updated successfully by the terminal.

The aforementioned authentication tuple may be generated by the network by use of a new authentication key NewKI after the message about successful update of the key returned by the terminal is received. After the message about failed update of the key returned by the terminal is received by the network, if a new authentication tuple is generated, the old authentication key KI is still used. Practically, in such a case, the network may not generate a new authentication tuple before it receives a message indicating the update of the key in the terminal; when it times out in waiting for the message indicating the execution result of key update returned by the terminal, if a new authentication tuple is generated, the old authentication key KI is still used.

The network may generate a new authentication key NewKI with the generated random challenge RAND and key KI after it determines that the terminal key is updated successfully. In such a case, the network needs to obtain the corresponding random challenge RAND after it receives a message about successful update of the key returned by the terminal. In practice, during the authentication, the RAND is contained in the corresponding authentication tuple stored on the network. Therefore, after the network determines that the key on the terminal side is updated successfully, it may generate a new authentication key NewKI with the random challenge RAND and key KI, and it may use the NewKI in place of the KI to generate the authentication tuple.

Referring to FIG. 1, a flow chart of the first implementation of the invention is illustrated.

When the authentication key KI stored on the network and in the terminal MS needs to be updated:

First, in Step 101, when the HLR/AUC on the network is to generate an authentication tuple, it assigns a stipulated specific value to the authentication management field AMF. The authentication tuple may include a random challenge RAND, an expected response XRES, a cipher key CK, an integrity key IK and an authentication token AUTN. The specific value may be understood as follows: the AMF is 2 bytes in length, and it is stipulated that the AMF takes hexadecimal number "AAAA" or binary number "1010101010101010" as its specific value to indicate that the key is updated. For convenience, the specific value is referred to as TmpAMF in the following.

In the existing Third Generation Partnership Project (3GPP) authentication protocols, it is specified that the message authentication code MAC-A is generated by use of the random challenge RAND, the sequence number SQNHE, the authentication key KI and the authentication management field AMF, etc.; a message authentication code MAC-S is generated by use of the random challenge RAND, the sequence number SQNMS, the authentication key KI and the authentication management field AMF, etc., i.e. the authentication management field AMF needs to be used; and an authentication token AUTN is generated by use of SQNHE, AMF and MAC-A, i.e., the authentication management field AMF needs to be used.

The authentication token AUTN is 16 bytes in length, which includes: 1) SQNHE^AK, in which the sequence number SQNHE or the anonymity key AK is respectively 6 bytes in length; the USIM will check whether the SQNHE generated by the AUC is up to date, which is an important part of the authentication process; 2) authentication management field AMF, which is 2 bytes in length; and 3) message authentication code MAC-A or MAC-S, which is 8 bytes in length, wherein MAC-A is used to verify the data integrity of the RAND, SQNHE and AMF and it is used by the USIM to authenticate the AUC, while message authentication code MAC-S is sent to the AUC by USIM for the authentication for USIM via AUC during the resynchronization.

It can be known from the above that the authentication management field AMF is a part of the authentication token AUTN for generating the message authentication code MAC-S and MAC-A. The AMF is 2 bytes in length, i.e. 16 bits.

After the AMF takes the stipulated specific value TmpAMF, the message authentication code MAC-A in the authentication token AUTN may be computed according to the random challenge RAND, sequence number SQNHE, authentication key KI and TmpAMF.

It should be noted that for the generation of the authentication tuple wherein the authentication management field AMF takes the stipulated specific value TmpAMF, the authentication management field AMF may take the specific value TmpAMF only when the key needs to be updated, and its original value stored in the HLR/AUC may keep unchanged, i.e. the authentication management field AMF still uses its original value when the HLR/AUC generates an authentication tuple next time. In other words, the stipulated specific value TmpAMF may be taken only when the present authentication tuple is generated. However, this specific value TmpAMF may also be used when the authentication tuple is generated next time. The AMF may take the stipulated specific value TmpAMF by assigning the stipulated value to some or all bits of the authentication management field AMF.

However, according to the 3GPP protocol specification, when an authentication tuple is generated practically, the expected response XRES, the cipher key CK, the integrity key IK and the anonymity key AK in the authentication tuple should be computed respectively according to the random challenge RAND and the authentication key KI. Therefore, the random challenge RAND, the authentication token AUTN, the expected response XRES, the cipher key CK and the integrity key IK constitute the authentication quintuplet.

In the method for updating the key according to the invention, only the random challenge RAND and the authentication token AUTN may be generated when an authentication tuple is generated; or during the generation of the corresponding authentication tuple, the random challenge RAND, the authentication token AUTN and only any one or more of the expected response XRES, the cipher key CK and the integrity key IK may be generated. In other words, when a quintuplet is to be constituted, any one or more of the expected response XRES, the cipher key CK and the integrity key IK may take any value, rather than be generated according to the random challenge RAND and the authentication key KI.

After the HLR/AUC generates the authentication tuple, or before the HLR/AUC generates the authentication quintuplet, or at the time when the authentication quintuplet is generated, the random challenge RAND and authentication key KI is used to generate a new key NewKI, which is used in place of the KI to generate the authentication tuple for the next time. After the HLR/AUC generates the authentication tuple, the corresponding International Mobile Subscriber Identification Number (IMSI) and the authentication quintuplet including the random challenge RAND, the cipher key CK, the integrity key IK, the expected response XRES and the authentication token AUTN are sent to MSC/VLR or SGSN. The MSC/VLR is a Circuit Switched Domain device, and for the network of the Packet Switched Domain, the corresponding device may be an SGSN.

In Step 103, the MSC/VLR or SGSN on the network transmits the random challenge RAND and the authentication token AUTN in the received authentication tuple to the terminal MS.

Step 105, after the terminal MS receives the authentication request message sent by the network, it determines whether the authentication for the network is passed; if the authentication for the network is not passed, then an authentication failure message or a resynchronization request message is returned to the network, and the present key update process ends.

If in Step 105, it is determined that the authentication for the network is passed, Step 107 is performed; for the description of the authentication process for the network via the terminal, please refer to the relevant protocol specifications of 3GPP.

In Step 107, the terminal determines whether the authentication management field AMF in the received authentication token AUTN is the stipulated specific value TmpAMF; if Yes, the key needs to be updated, and in Step 109, the authentication key KI and the random challenge RAND are used to generate a new key NewKI for use in the authentication next time, then the present key update process ends.

If in Step 107, it is determined that the authentication management field AMF is not the stipulated specific value TmpAMF, then the present key update process ends directly. The terminal operates according to the normal authentication process, for example, it sends the expected authentication response generated to the MSC/VLR, which determines whether the authentication for the terminal is passed or not by determining whether the expected authentication response returned by the terminal is consistent with the expected response in the corresponding quintuplet. For the description of the authentication process for the terminal via the network, please refer to the relevant protocols of 3GPP.

In Step 109, a message indicating the execution result of key update may be further returned to the network and the message indicating the execution result of key update may be message about successful update of the key and/or message about failed update of the key. The returning of the message indicating the execution result of key update may be realized via a synchronization request message, i.e. the terminal returns a synchronization request message to the network after the authentication for the network is passed and the new key is generated, and in combination with the authentication key KI and the random challenge RAND, a stipulated specific value may be used in place of the sequence number SQNMS to generate the authentication token AUTS, which is returned to the network. For example, the specific value may be a hexadecimal number "0000000000AA", which indicates that the key is updated successfully, or it may be a hexadecimal number "0000000000BB", which indicates that the key failed to be updated. For convenience, the specific value is referred to as TmpSQN in the following. When the HLR/AUC on the network processes the synchronization request message, it determines whether the SQNMS is the specific value TmpSQN. If No, the procedure is as in a normal process; otherwise, the message is processed as a message indicating the execution result of key update, and it can be determined with the message whether the key update on the terminal side is successful. Therefore, the terminal may achieve the returning of the information indicating the execution result of key update with the existing synchronization request message and the parameter of the sequence number SQNMS, without requesting additional signaling sources or parameters.

However, the aforementioned message about successful update of the key may be returned to the network in other ways. For example, short message or USSD (Unstructured Supplementary Services Data, i.e. Unstructured Supplementary Data Service) or Over-the-Air (OTA) or other concerted method for transmitting information between the terminal and the network may be used.

In addition, after the new authentication key NewKI is generated, the HLR/AUC on the network may generate the authentication tuple with the new authentication key NewKI after the message about successful update of the key returned by the terminal is received. In practice, the HLR/AUC may not generate the new authentication tuple before the message indicating the execution result of terminal key update is received. However, the authentication tuple may also be generated by use of the new authentication key NewKI when the NewKI is generated by the HLR/AUC.

In Step 101, the old authentication tuple on the network may further be removed. For example, the HLR/AUC determines whether the old authentication tuple still exists. If Yes, the old authentication tuple will be deleted; otherwise, no deletion will be performed and a message Cancel Location will be initiated to the MSC/VLR/SGSN, in which the Cancellation Type will be set as "Subscription Withdrawn", and at this point, the MSC/VLR/SGSN will delete all the context information of the related subscriber immediately. For the "Cancel Location message", please refer to the relevant protocols of 3GPP. Therefore, the subsequent key update status may be simplified.

In addition, when the network generates the authentication tuple with the new authentication key, it may further determine whether the old authentication tuple still exists on the network, if Yes, the old authentication tuple will be deleted.

Figure 2:
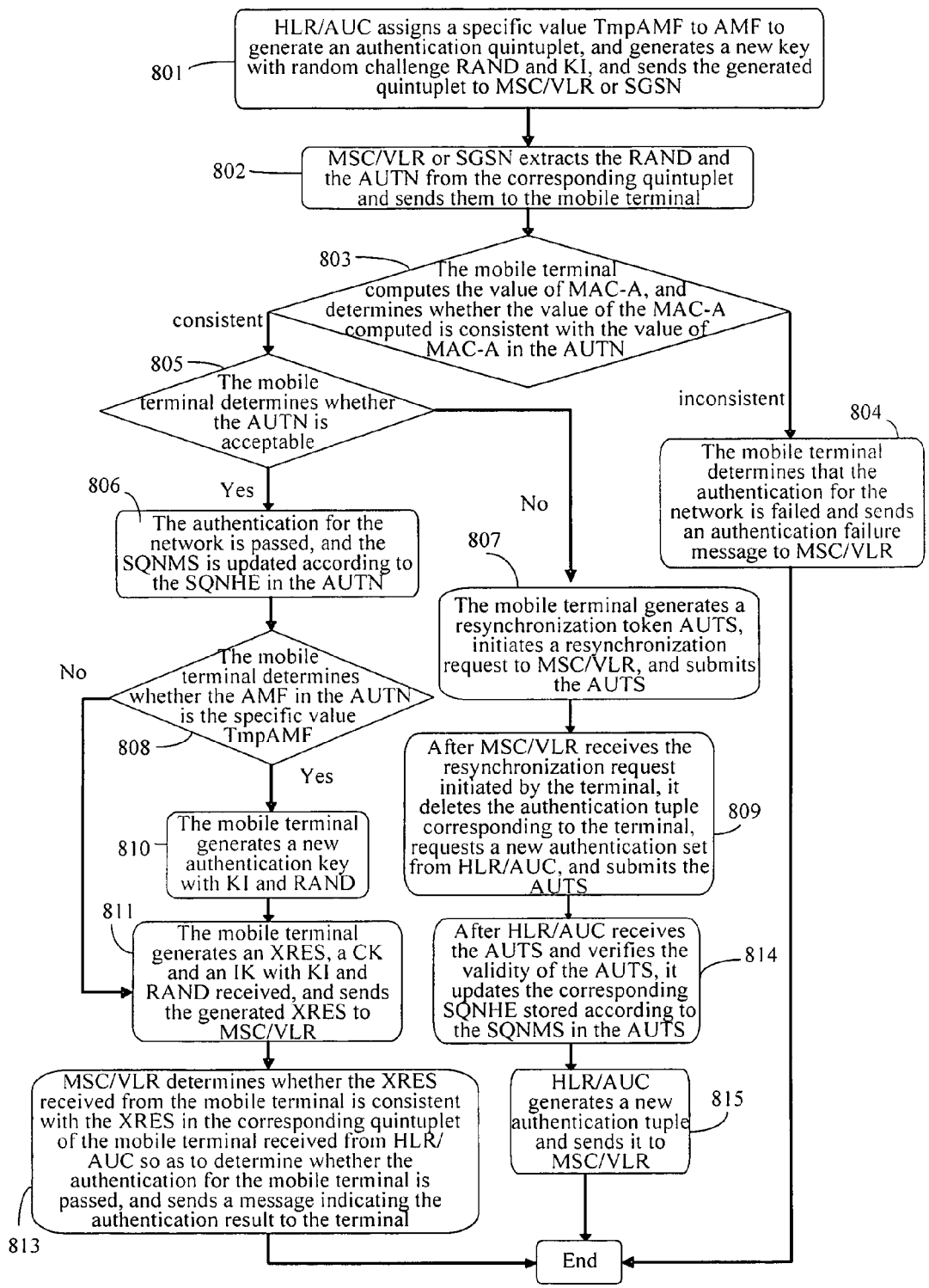
FIG. 2 is a flow chart of the method for updating the key according to an embodiment of the first implementation of the invention.

Referring to FIG. 2, which shows an embodiment of the first implementation of the invention. In the existing 3G mobile communication system, the international mobile subscriber identity IMSI, the authentication key KI and the sequence number SQNMS are stored in the mobile terminal, and the international mobile subscriber identity IMSI, the authentication key KI and the sequence number SQNHE are stored in the HLR/AUC correspondingly for the mobile terminal, so as to be used for the authentication between the mobile terminal and the network.

In Step 801, when the HLR/AUC on the network generates the authentication tuple, the authentication management field AMF is assigned a stipulated specific value to generate the authentication tuple. The authentication tuple may include the random challenge RAND, the expected response XRES, the cipher key CK, the integrity key IK and the authentication token AUTN. The HLR/AUC first generates a random challenge RAND with a random challenge generator, and the expected response XRES, the cipher key CK and the integrity key IK are computed by use of the authentication key KI stored in the HLR/AUC and the random challenge RAND generated. A stipulated specific value TmpAMF is used in place of the authentication management field AMF when the message authentication code MAC-A is computed, i.e. the message authentication code MAC-A is generated by use of the authentication key KI, the random challenge RAND, the sequence number SQNHE and the TmpAMF. For the specific value, it may be understood as follows: the authentication management field AMF is 2 bytes in length, and it is stipulated that the authentication management field AMF may take the value of hexadecimal number "AAAA" or binary number "1010101010101010", which indicates that the key needs to be updated. A new authentication key NewKI is generated by use of the authentication key KI and the random challenge RAND. The message authentication code MAC-A, the TmpAMF and the sequence number SQNHE may constitute the authentication token AUTN. The quintuplet consisting of the random challenge RAND, the authentication token AUTN, the expected response XRES, the cipher key CK and the integrity key IK as well as the corresponding international mobile subscriber identity IMSI may be sent together to the MSC/VLR.

In the method for updating the key according to the invention, only the random challenge RAND and the authentication token AUTN may be generated when the authentication tuple is generated; or, during the generation of the corresponding authentication tuple, the random challenge RAND, the authentication token AUTN and only any one or more of the expected response XRES, the cipher key CK and the integrity key IK may be generated. In other words, when a quintuplet is to be constituted, any one or more of the expected response XRES, the cipher key CK and the integrity key IK may take any value, instead of generating a value according to the random challenge RAND and the authentication key KI.

Further, the old authentication tuple on the network may be removed. For example, the HLR/AUC determines whether the old authentication tuple still exists, if No, no delete operation will be performed; otherwise, the old authentication tuple will be delete, and a message Cancel Location will be initiated to the MSC/VLR/SGSN, in which the Cancellation Type is set as "Subscription Withdrawn", and at this point, the MSC/VLR/SGSN will delete all the context information of the related subscriber immediately. For the "Cancel Location message", please refer to the relevant protocols of 3GPP. Therefore, the subsequent key update status may be simplified.

In Step 802, during the authentication, the MSC/VLR extracts the random challenge RAND and the authentication token AUTN from the corresponding quintuplet, and sends the extracted random challenge RAND and the authentication token AUTN to the mobile terminal via the authentication request message.

In Step 803, the mobile terminal obtains the value of the message authentication code MAC-A according to the computation with the authentication key KI, the received random challenge RAND, the sequence number SQNHE and the authentication management field AMF in the authentication token AUTN, and determines whether the obtained value of the message authentication code MAC-A is consistent with the value of the message authentication code MAC-A in the authentication token AUTN. If No, Step 804 is performed; otherwise, Step 805 is performed.

In Step 804, the mobile terminal determines that the authentication for the network is failed and returns an authentication failure message to the MSC/VLR; the present key update process ends.

In Step 805, the mobile terminal determines whether the authentication token AUTN is acceptable, for example, it determines whether the difference between the sequence number SQNHE in the authentication token AUTN and the sequence number SQNMS stored in itself is within a predetermined range. If Yes, Step 806 is performed; otherwise, Step 807 is performed.

In Step 806, the mobile terminal determines that the authentication for the network is passed, and the sequence number SQNMS is updated according to the sequence number SQNHE in the authentication token AUTN, then Step 808 is performed.

In Step 808, the mobile terminal determines whether the authentication is management field AMF in the authentication token AUTN is the stipulated specific value TmpAMF. If Yes, Step 810 is performed; otherwise, Step 811 is performed directly.

In Step 810, the mobile terminal generates a new authentication key NewKI for use in the next authentication with the authentication key KI and the random challenge RAND; then Step 811 is performed.

In Step 811, the mobile terminal generates the expected response XRES, the cipher key CK and the integrity key IK with the authentication key KI and the received random challenge RAND, and sends the expected response XRES generated to the MSC/VLR; then Step 813 is performed.

In Step 813, the MSC/VLR determines whether the expected response XRES received from the mobile terminal is consistent with the expected response XRES in the corresponding quintuplet for the mobile terminal received from the HLR/AUC. If Yes, then it is determined that the authentication for the mobile terminal via the network is passed; otherwise, it is determined that the authentication is failed. The MSC/VLR returns the result of the authentication for the mobile terminal to the mobile terminal, and then terminates the process.

In Step 807, the mobile terminal generates a resynchronization token AUTS with the authentication key KI, the random challenge RAND and the sequence number SQNMS, etc., and initiates a resynchronization request to the MSC/VLR, and submits the AUTS; then Step 809 is performed.

In Step 809, after the MSC/VLR receives the resynchronization request initiated by the terminal, it deletes the authentication tuple corresponding to the terminal, and requests a new authentication set from the HLR/AUC, and submits the AUTS and the random challenge RAND in the corresponding quintuplet; then Step 814 is performed.

In Step 814, after the HLR/AUC receives the AUTS and the random challenge RAND and verifies that the AUTS is valid according to the authentication key KI and the random challenge RAND received, etc., it is updates the stored corresponding sequence number SQNHE according to the sequence number SQNMS in the AUTS; then Step 815 is performed.

In Step 815, the HLR/AUC generates a new authentication tuple and sends it to the MSC/VLR; then, the process ends.

It should be noted that, in order to be distinguished from the sequence number SQNMS stored in the terminal, the sequence number stored in the HLR/AUC is usually referred to as SQNHE; but sometimes SQNMS may be directly referred to as the SQN stored in the terminal, and SQNHE may be referred to as the SQN correspondingly stored in the HLR/AUC.

In the aforementioned Step 809, the MSC/VLR may not delete the authentication tuple corresponding to the terminal firstly, but delete the authentication tuple corresponding to the terminal after Step 815 is executed and the MSC/VLR receives the new authentication tuple generated by the HLR/AUC.

In the aforementioned embodiment, after the HLR/AUC generates the new authentication key NewKI, it uses the new authentication key NewKI in place of the authentication key KI to generate the authentication tuple for the next time. Correspondingly, after the terminal generates the new authentication key NewKI, during the next authentication, it uses the new authentication key NewKI to authenticate the network and to generate the expected response XRES, the cipher key CK and the integrity key IK, etc.

The HLR/AUC may not know whether the authentication key has been updated. Therefore, when a terminal has not generated the new authentication key, yet the HLR/AUC uses the authentication tuple generated with the new authentication key, so that the authentication for the terminal and the MSC/VLR cannot be passed. Therefore, after the terminal generates the new authentication key, it may return a confirmation message to the HLR/AUC and inform the HLR/AUC that it has generated a new authentication key. The terminal may use a synchronization process to return the confirmation message to the HLR/AUC, or may via short message, or via USSD or OTA.

In addition, the network may also determine whether the location of the terminal is updated before it receives the message about successful update of the key returned from the terminal. If it is updated, the network generates the authentication tuple with the new authentication key; otherwise, the network generates the authentication tuple without using the new authentication key.

Figure 3:
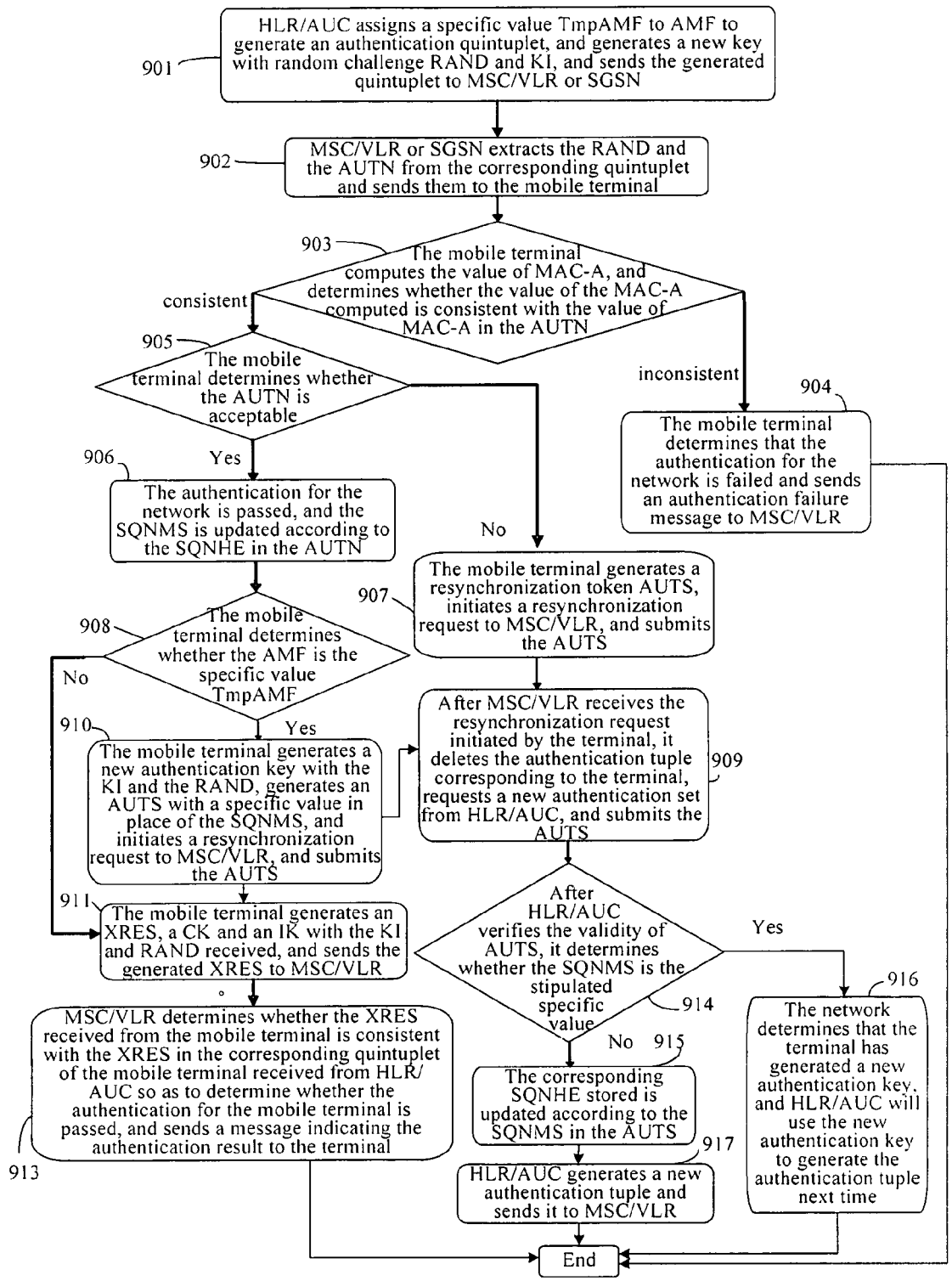
FIG. 3 is a flow chart of the method for updating the key according to another embodiment of the first implementation of the invention.

Referring to FIG. 3, another embodiment of the first implementation of the invention includes the following steps:

In Step 901, when the HLR/AUC on the network generates an authentication tuple, it assigns a stipulated specific value to the authentication management field AMF to generate the authentication tuple. The authentication tuple may include a random challenge RAND, an expected response XRES, a cipher key CK, an integrity key IK and an authentication token AUTN. The HLR/AUC generates the random challenge RAND with a random challenge generator, and obtains the expected response XRES, the cipher key CK and the integrity key IK with the corresponding authentication key KI and the random challenge RAND generated, and generates a message authentication code MAC-A with the authentication key KI, the random challenge RAND, a sequence number SQNHE and the stipulated specific value in place of the authentication management field AMF. For convenience, the specific value is also referred to as TmpAMF. For the specific value, it may be interpreted as follows: the authentication management field AMF is 2 bytes in length, and it may be stipulated that the AMF takes the specific value of hexadecimal number "AAAA" or binary number "1010101010101010", which indicates that the key is updated. The HLR/AUC also generates the new authentication key NewKI with the authentication key KI and the random challenge RAND. The message authentication code MAC-A, the TmpAMF and the sequence number SQNHE may constitute the authentication token AUTN. The quintuplet consisting of the random challenge RAND, the authentication token AUTN, the expected response XRES, the cipher key CK and the integrity key IK as well as the corresponding international mobile subscriber identity IMSI may be sent together to the MSC/VLR.

According to the method for updating the key according to the invention, only the random challenge RAND and the authentication token AUTN may be generated when the authentication tuple is generated; or, during the generation of the corresponding authentication tuple, the random challenge RAND, the authentication token AUTN and only any one or more of the expected response XRES, the cipher key CK and the integrity key IK may be generated. In other words, when a quintuplet is constituted, any one or more of the expected response XRES, the cipher key CK and the integrity key IK may take any value, instead of generating a value according to the random challenge RAND and the authentication key KI.

The old authentication tuple on the network may further be removed. For example, the HLR/AUC determines whether an old authentication tuple still exists, if No, no delete operation will be performed; otherwise, the old authentication tuple will be deleted, and a message Cancel Location will be initiated to the MSC/VLR/SGSN, in which the Cancellation Type is set as "Subscription Withdrawn", and at this point, the MSC/VLR/SGSN will delete all the context information of the related subscriber immediately. For the "Cancel Location message", please refer to the relevant protocols of 3GPP. Therefore, the subsequent key update status may be simplified.

In Step 902, during the authentication, the MSC/VLR extracts the random challenge RAND and the authentication token AUTN from the corresponding quintuplet, and sends the extracted random challenge RAND and the authentication token AUTN to the mobile terminal via an authentication request message.

In Step 903, the mobile terminal obtains the value of the message authentication code MAC-A according to the computation with the authentication key KI, the received random challenge RAND, the sequence number SQNHE and the authentication management field AMF in the authentication token AUTN, and determines whether the obtained value of the message authentication code MAC-A is consistent with the value of the message authentication code MAC-A in the authentication token AUTN. If No, Step 904 is performed; otherwise, Step 905 is performed.

In Step 904, the mobile terminal determines that the authentication for the network is failed and returns an authentication failure message to the MSC/VLR; then terminates the present key update process.

In Step 905, the mobile terminal determines whether the authentication token AUTN is acceptable. For example, it determines whether the difference between the sequence number SQNHE in the authentication token AUTN and the sequence number SQNMS stored in itself is within a predetermined range. If Yes, Step 906 is performed; otherwise, Step 907 is performed.

In Step 906, the mobile terminal determines that the authentication for the network is passed, and the sequence number SQNMS is updated according to the sequence number SQNHE in the authentication token AUTN, then Step 908 is performed.

In Step 908, the mobile terminal determines whether the authentication management field AMF in the authentication token AUTN is the stipulated specific value TmpAMF. If Yes, Step 910 is performed; otherwise, Step 911 is performed.

In Step 910, the mobile terminal generates a new authentication key NewKI with the authentication key KI and the random challenge RAND, and in combination with the authentication key KI and the random challenge RAND, etc., a stipulated specific value TmpSQN may be used in place of the sequence number SQNMS to generate an AUTS. For example, the sequence number is 6 bytes in length, the stipulated specific value of hexadecimal number "0000000000AA" indicates that the key is updated successfully; the stipulated specific value of hexadecimal number "0000000000BB" indicates that the key failed to be updated. Then a resynchronization request is initiated to the MSC/VLR, and the AUTS is submitted. Then, Step 909 is performed.

In Step 911, the mobile terminal generates the expected response XRES, the cipher key CK and the integrity key IK with the authentication key KI and the received random challenge RAND, and sends the expected response XRES generated to the MSC/VLR.

In Step 913, the MSC/VLR determines whether the expected response XRES received from the mobile terminal is consistent with the expected response XRES in the corresponding quintuplet for the mobile terminal received from the HLR/AUC. If Yes, then it is determined that the authentication for the mobile terminal via the network is passed; otherwise, it is determined that the authentication is failed. The MSC/VLR returns the result of the authentication for the mobile terminal to the mobile terminal, and then terminates the process.

In Step 907, the mobile terminal generates a resynchronization token AUTS with the authentication key KI, the random challenge RAND and the sequence number SQNMS, etc., and initiates a resynchronization request to the MSC/VLR, and submits the AUTS; then Step 909 is performed.

In Step 909, after the MSC/VLR receives the resynchronization request initiated by the terminal, it deletes the authentication tuple corresponding to the terminal, and requests a new authentication set from the HLR/AUC, and submits the AUTS and the random challenge RAND in the corresponding quintuplet; then Step 914 is performed.

In Step 914, after the HLR/AUC receives the AUTS and the random challenge RAND and verifies that the AUTS is valid according to the authentication key KI and the received random challenge RAND, etc, it determines whether the sequence number SQNMS has the stipulated specific value. If Yes, Step 916 is performed; otherwise, Step 915 is performed.

In Step 916, the network determines that the terminal has generated a new authentication key. Therefore, the HLR/AUC will use the new authentication key to generate the authentication tuple next time; then, the process ends.

In Step 915, the corresponding sequence number SQNHE stored is updated according to the sequence number SQNMS in the AUTS; then Step 917 is performed.

In Step 917, the HLR/AUC generates a new authentication tuple and sends it to the MSC/VLR; then, the process ends.

In practice, Step 917 may be further executed after Step 916.

In the aforementioned Step 909, the MSC/VLR may not delete the authentication tuple corresponding to the terminal firstly, but delete the old authentication tuple corresponding to the terminal after Step 917 is executed and the MSC/VLR receives the new authentication tuple generated by the HLR/AUC.

Figure 4:
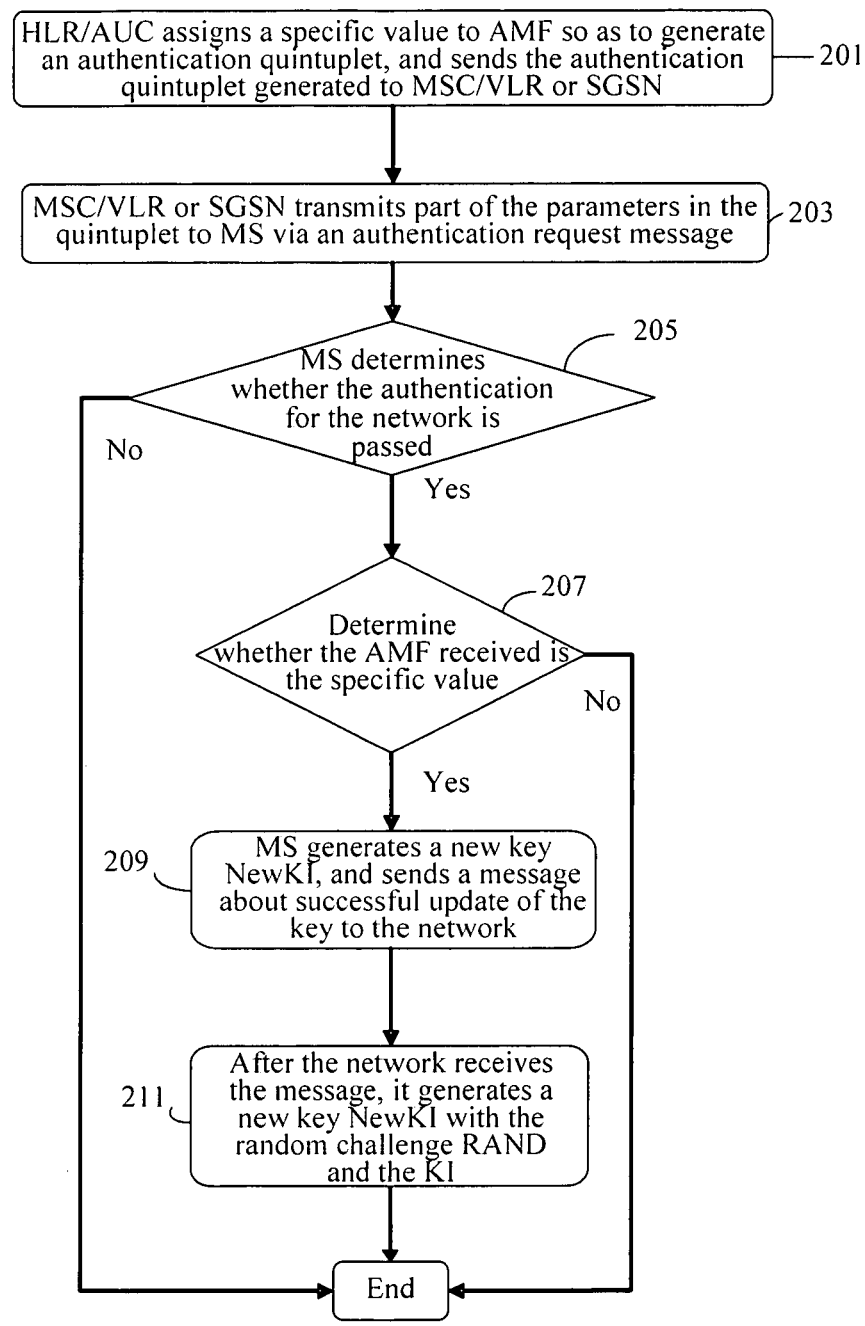
FIG. 4 is a flow chart of the method for updating the key according to the second implementation of the invention.

Referring to FIG. 4, a flow chart of the second implementation of the invention is illustrated.

When the authentication key KI stored in the HLR/AUC and the MS needs to be updated:

First, in Step 201, the HLR/AUC on the network assigns a stipulated specific value TmpAMF to the authentication management field AMF to generate an authentication tuple when the authentication tuple is generated. The authentication tuple may include a random challenge RAND, an expected response XRES, a cipher key CK, an integrity key IK and an authentication token AUTN. For the specific value, it may be understood as follows: the authentication management field AMF is 2 bytes in length. For example, it may be stipulated that the authentication management field AMF takes a specific value of hexadecimal number "AAAA" or binary number "1010101010101010", which indicates that the key is updated. It is specified in the existing 3GPP authentication protocols that a message authentication code MAC-A is generated by use of the random challenge RAND, the sequence number SQNHE, the authentication key KI and the authentication management field AMF, etc., and a message authentication code MAC-S is generated by use of the random challenge RAND, the sequence number SQNMS, the authentication key KI and the authentication management field AMF, etc., and the authentication token AUTN is generated by use of the sequence number SQNHE, the authentication management field AMF and the message authentication code MAC-A.

The authentication token AUTN is 16 bytes in length and includes: 1) SQNHE^ AK, in which the sequence number SQNHE and the anonymity key AK are respectively 6 bytes in length, the USIM will verify whether the sequence number SQNHE generated by the AUC is up to date, which is an important part of the authentication process; 2) authentication management field AMF, 2 bytes in length; 3) message authentication code MAC-A or MAC-S, 8 bytes in length, wherein the message authentication code MAC-A is used to verify the data integrity of the random challenge RAND, the sequence number SQNHE and the authentication management field AMF, and the message authentication code MAC-S is sent to the AUC by the USIM for the authentication in a resynchronization process.

It can be known from the above that the authentication management field AMF is a component of the authentication token AUTN and is used to generate the message authentication code MAC-S and MAC-A. The authentication management field AMF is 2 bytes in length, i.e. 16 bits. After the authentication management field AMF takes a stipulated specific value TmpAMF, the message authentication code MAC-A in the authentication token AUTN is computed according to the random challenge RAND, the sequence number SQNHE, the authentication key KI and the authentication management field AMF with the stipulated specific value TmpAMF.

It should be noted that for the generation of the authentication tuple wherein the authentication management field AMF takes the stipulated specific value TmpAMF, the authentication management field AMF may take the specific value TmpAMF only when a key needs to be updated, and its original value stored in the HLR/AUC may keep unchanged, i.e. the authentication management field AMF may still use its original value when an authentication tuple is generated in other cases. In other words, the stipulated specific value TmpAMF may be taken only when the present authentication tuple is generated. However, this specific value TmpAMF may also be used during the generation of the authentication tuple next time.

However, according to the 3GPP protocol specification, when an authentication tuple is generated practically, the expected response XRES, the cipher key CK, the integrity key IK and the anonymity key AK should be computed respectively according to the random challenge RAND and the authentication key KI. Therefore, the random challenge RAND, the authentication token AUTN, the expected response XRES, the cipher key CK and the integrity key IK constitute the authentication quintuplet.

According to the method for updating the key according to the invention, only the random challenge RAND and the authentication token AUTN may be generated when the authentication tuple is generated; or during the generation of the corresponding authentication tuple, the random challenge RAND, authentication token AUTN and only any one or more of expected response XRES, cipher key CK and integrity key IK may be generated. In other words, when a quintuplet is to be constituted, any one or more of the expected response XRES, the cipher key CK and the integrity key IK may take any value, rather than be generated according to the random challenge RAND and the authentication key KI.

After the HLR/AUC generates the authentication tuple, the corresponding international mobile subscriber identifier IMSI and the authentication quintuplet random challenge RAND, the cipher key CK, the integrity key IK, the expected response XRES and the authentication token AUTN are sent to MSC/VLR or an SGSN. The MSC/VLR is a circuit switched domain device. For a network of the packet switched domain, the corresponding device is SGSN.

In Step 203, the MSC/VLR or SGSN on the network transmits the random challenge RAND and the authentication token AUTN in the received authentication tuple to the terminal MS.

In Step 205, after the terminal MS receives an authentication request message, it determines whether the authentication for the network is passed; if it is not passed, then returns an authentication failure message or an resynchronization request message to the network, and the present key update process ends; otherwise, Step 207 is performed. As to the description of the authentication process for the network via the terminal, please refer to the relevant protocol specifications of 3GPP.

In Step 207, it is determined whether the authentication management field AMF has the stipulated specific value TmpAMF; if Yes, it's considered that the key needs to be updated and the authentication key KI and the random challenge RAND are used to generate a new key NewKI in Step 209 for use in generating the authentication tuple next time, and a message about successful update of the key is returned to the network. If it is determined that the authentication management field AMF does not have the stipulated specific value TmpAMF, then the present key update process ends. The terminal operates according to the normal authentication process, for example, it sends the expected authentication response generated to the MSC/VLR or SGSN, and the MSC/VLR or SGSN determines whether the authentication for the terminal is passed or not by determining whether the expected authentication response returned by the terminal is consistent with the expected response in the corresponding quintuplet. For the description of the authentication process for the terminal by the network, please refer to the relevant protocols of 3GPP.

In Step 211, after the network receives the message about successful update of the key returned by the MS, it generates a new key NewKI with the random challenge RAND and the authentication key KI stored in the corresponding quintuplet, and the new key NewKI is to be used in place of the KI to generate the authentication tuple next time.

In the aforementioned Step 209, the terminal may return a message about successful update of the key to the network via a synchronization request command. In other words, the terminal returns a synchronization request command to the network after the authentication for the network is passed and a new key is generated, and in combination with the authentication key KI and the random challenge RAND, a stipulated specific value TmpSQN may be used in place of the sequence number SQNMS to generate the authentication token AUTS, which is returned to the network. For example, the SQNMS is 6 bytes in length, and it uses a stipulated specific value of hexadecimal number "0000000000AA" to indicate that the key is updated successfully, and use hexadecimal number "0000000000BB" to indicate that the key failed to be updated. When the HLR/AUC on the network processes the synchronization request message, it determines whether the sequence number SQNMS is the stipulated specific value TmpSQN. If No, it proceeds according to the normal process; if Yes, it may be determined whether the key on the terminal side is updated successfully via the specific value. Therefore, the existing synchronization request command and the SQNMS parameters may be utilized to return the message about successful update of the key, without requesting additional signaling sources or parameters.

However, the aforementioned message about successful update of the key may be returned to the network in other ways, such as via short message or by USSD or OTA or other ways for information transmission concerted with the network.

In Step 201, the old authentication tuple on the network may further be removed. For example, the HLR/AUC determines whether an old authentication tuple still exists. If No, no delete operation will be performed; otherwise, the old authentication tuple will be deleted, and a message Cancel Location will be initiated to the MSC/VLR/SGSN, in which the Cancellation Type is set as "Subscription Withdrawn", at this point, the MSC/VLR/SGSN will delete all the context information of the related subscriber immediately. For the "Cancel Location message", please refer to the relevant protocols of 3GPP. Therefore, the subsequent key update status may be simplified.

When the network generates the authentication tuple with the new authentication key, it may further determine whether the old authentication tuple still exists on the network; if it still exists, the old authentication tuple will be deleted.

Figure 5:
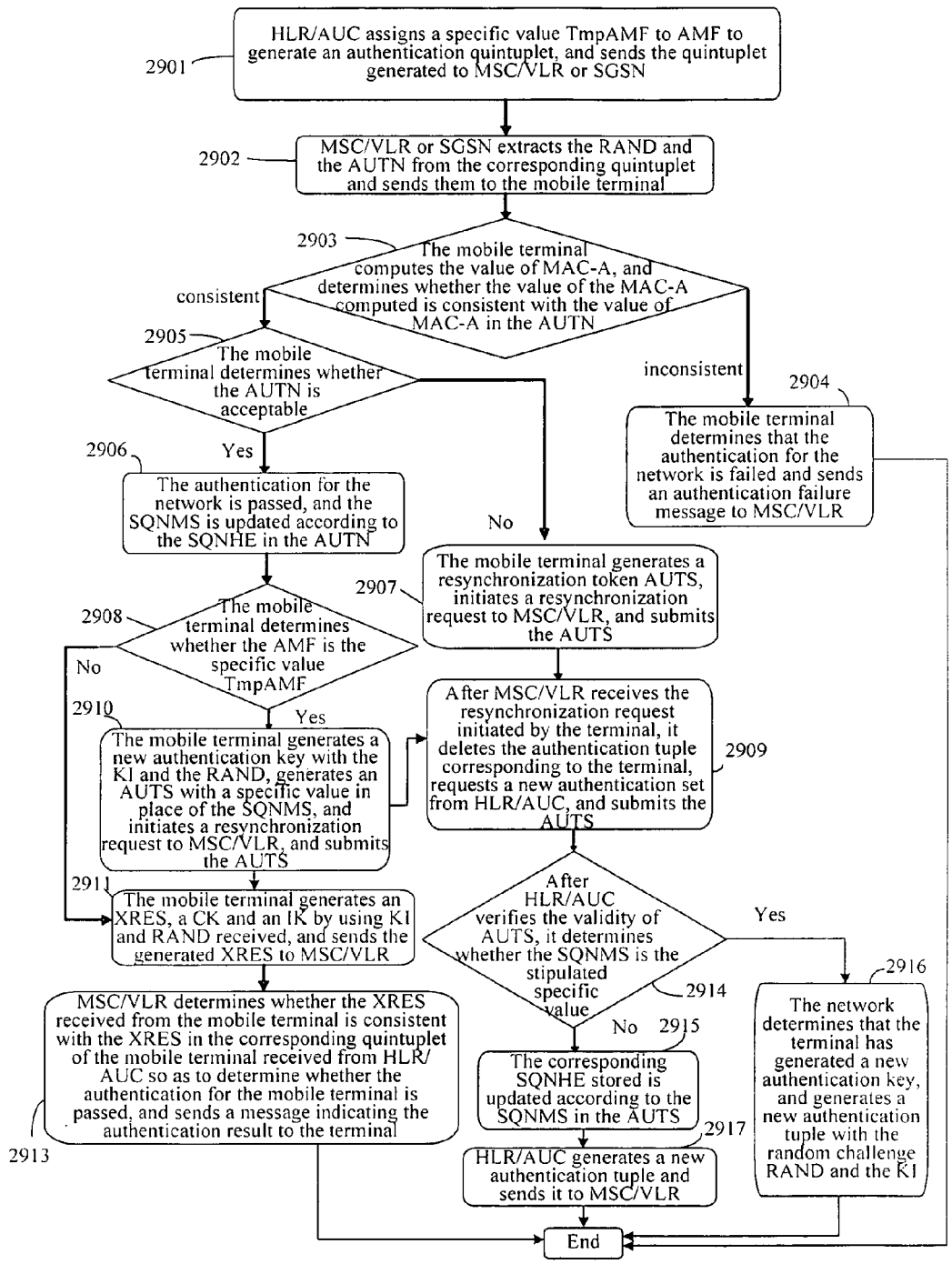
FIG. 5 is a flow chart of the method for updating the key according to an embodiment of the second implementation of the invention.

Referring to FIG. 5, which shows an embodiment of the second implementation of the invention.

In Step 2901, when the HLR/AUC on the network is to generate an authentication tuple, it assigns a stipulated specific value to the authentication management field AMF to generate the authentication tuple. The authentication tuple may include a random challenge RAND, an expected response XRES, a cipher key CK, an integrity key IK and an authentication token AUTN. The HLR/AUC generates the random challenge RAND with a random challenge generator, and obtains the expected response XRES, the cipher key CK and the integrity key IK with the corresponding authentication key KI and the random challenge RAND, and generates a message authentication code MAC-A with the integrity key KI, the random challenge RAND, the sequence number SQNHE and a stipulate specific value TmpAMF in place of the authentication management field AMF. For the specific value, it may be understood as follows: the authentication management field AMF is 2 bytes in length, and it is stipulated that the authentication management field AMF takes a specific value of hexadecimal number "AAAA" or binary number "1010101010101010", which indicates that the key is updated. The authentication token AUTN will be constituted by the message authentication code MAC-A, the TmpAMF, and the sequence number SQNHE. The quintuplet consisting of the random challenge RAND, the authentication token AUTN, the expected response XRES, the cipher key CK and the integrity key IK as well as the corresponding IMSI may be sent together to the MSC/VLR.

According to the method for updating the key according to the invention, only the random challenge RAND and the authentication token AUTN may be generated when the authentication tuple is generated; or, during the generation of the corresponding authentication tuple, the random challenge RAND, the authentication token AUTN and only any one or more of the expected response XRES, the cipher key CK and the integrity key IK may be generated. In other words, when a quintuplet is to be constituted, any one or more of the expected response XRES, the cipher key CK and the integrity key IK may take any value, rather than be generated according to the random challenge RAND and the authentication key KI.

Here, the old authentication tuple on the network may further be removed. For example, the HLR/AUC determines whether an old authentication tuple still exists. If No, no delete operation will be performed; otherwise, the old authentication tuple will be deleted, and a message Cancel Location will be initiated to the MSC/VLR/SGSN, in which the Cancellation Type is set as "Subscription Withdrawn", at this point, the MSC/VLR/SGSN will delete all the context information of the related subscriber immediately. For the "Cancel Location message", please refer to the relevant protocols of 3GPP. Therefore, the subsequent key update status may be simplified.

In Step 2902, during the authentication, the MSC/VLR extracts the random challenge RAND and the authentication token AUTN from the corresponding quintuplet, and sends the extracted random challenge RAND and the authentication token AUTN to the mobile terminal via an authentication request message.

In Step 2903, the mobile terminal obtains the value of a message authentication code MAC-A according to the authentication key KI, the random challenge RAND received, the authentication management field AMF in the authentication token AUTN and the sequence number SQNHE, and determines whether the obtained value of the message authentication code MAC-A is consistent with the value of the message authentication code MAC-A in the authentication token AUTN; if they are not consistent with each other, Step 2904 is performed; otherwise, Step 2905 is performed.

In Step 2904, the mobile terminal determines that the authentication for the network failed and returns an authentication failure message to the MSC/VLR; then, the present key update process ends.

In Step 2905, the mobile terminal determines whether the authentication token AUTN is acceptable, for example, it determines whether the difference between the sequence number SQNHE in the authentication token AUTN and the sequence number SQNMS stored in itself is within a predetermined range; if Yes, Step 2906 is performed; otherwise, Step 2907 is performed.

In Step 2906, the authentication for the network via the mobile terminal is passed, and the sequence number SQNMS will be updated according to the sequence number SQNHE in the authentication token AUTN.

In Step 2907, the mobile terminal generates a resynchronization token AUTS according to the authentication key KI, the random challenge RAND and the sequence number SQNMS, and initiates a resynchronization request to the MSC/VLR, and the authentication token AUTS is submitted; then Step 2909 is performed.

In Step 2908, the mobile terminal determines whether the authentication management field AMF in the authentication token AUTN has the stipulated specific value. If Yes, Step 2910 is performed; otherwise, Step 2911 is performed.

In Step 2910, the mobile terminal generates a new authentication key with the authentication key KI and the random challenge RAND, and generates an AUTS by the stipulated specific value TmpSQN in place of the sequence number SQNMS, the random challenge RAND, the authentication management field AMF and the authentication key KI, etc. For example, the sequence number SQNMS is 6 bytes in length, and the stipulated specific value of hexadecimal number "0000000000AA" indicates that the key is updated successfully; a stipulated specific value of hexadecimal number "0000000000BB" indicates that the key failed to be updated; and a resynchronization request is initiated to the MSC/VLR, the AUTS is submitted; then Step 2909 is performed.

In Step 2911, the mobile terminal generates the expected response XRES, the cipher key CK and the integrity key IK with the authentication key KI and the received random challenge RAND, and sends the expected response XRES generated to the MSC/VLR.

In Step 2913, the MSC/VLR determines whether the expected response XRES received from the mobile terminal is consistent with the expected response XRES in the corresponding quintuplet for the mobile terminal received from the HLR/AUC. If they are consistent with each other, then it is determined that the authentication for the mobile terminal via the network is passed; otherwise, the authentication is failed. The MSC/VLR returns the authentication result for the mobile terminal to the mobile terminal. Then, the process ends.

In Step 2909, after the MSC/VLR receives the resynchronization request initiated by the terminal, it deletes the authentication tuple corresponding to the terminal, and requests a new authentication set from the HLR/AUC, and submits the AUTS and the random challenge RAND in the corresponding quintuplet; then Step 2914 is performed.

In Step 2914, after the HLR/AUC receives the AUTS and the random challenge RAND and verifies that the AUTS is valid according to the authentication key KI and the random challenge RAND received, it determines whether the sequence number SQNMS is the stipulated specific value. If Yes, Step 2916 is performed; otherwise, Step 2915 is performed.

In Step 2916, the network determines that the terminal has generated a new authentication key, and then the HLR/AUC generates a new authentication key with the authentication key KI and the random challenge RAND. The new authentication key will be used to generate the authentication tuple next time; then, the process ends.

In Step 2915, the stored corresponding sequence number SQNHE is updated according to the sequence number SQNMS in the AUTS; then Step 2917 is performed.

In Step 2917, the HLR/AUC generates a new authentication tuple and sends it to the MSC/VLR; then, the process ends.

In practice, Step 2917 may be further performed after Step 2916.

In the aforementioned Step 2909, the MSC/VLR may not delete the authentication tuple corresponding to the terminal at first, but delete it after Step 2917 is executed and the MSC/VLR receives the new authentication tuple generated by the HLR/AUC.

According to the aforementioned implementation or embodiments, the synchronization process may further be a process for synchronizing the sequence number, and the synchronization request may further be a request for synchronizing the sequence number.

According to the aforementioned implementation or embodiments, the network may send the corresponding parameters in the authentication tuple to a terminal when various requests or commands for updating the key is sent or received, rather than be limited to the time when the authentication request is sent.

According to the aforementioned implementation or embodiments, the terminal may determine whether the authentication for the network is passed before or after it determines whether the authentication management field AMF has the specific value, or simultaneously.

According to the aforementioned implementation or embodiments, the SQNHE^AK indicates that the sequence number SQNHE is encrypted with the anonymity key AK, wherein, the anonymity key AK may be computed with the authentication key KI and the random challenge RAND. Moreover, when the sequence number SQNHE needs not to be encrypted, the anonymity key AK is 0.

According to the aforementioned implementation or embodiments, the terminal may generate the authentication token AUTS further according to the authentication management field AMF. Correspondingly, when the HLR/AUC on the network verifies the validity of the AUTS, it may further verify the validity of the AUTS according to the authentication management field AMF.

According to the aforementioned implementation or embodiments, it may further include: after the HLR/AUC generates a new authentication key, if a subsequent new authentication tuple is generated by use of the new authentication key, and a synchronization request from the terminal is generated in the authentication process based on the new authentication tuple, then the network will also verify the validity of the synchronization request, i.e. the validity of the AUTS, with the new authentication key. In other words, if a new authentication key is used to generate a subsequent new authentication tuple, then during the authentication performed by the HLR/AUC, a new authentication key will be used in place of the old authentication key to execute the authentication operation.

According to the aforementioned implementation or embodiments, as to the validation of the validity of the AUTS via the HLR/AUC, the update of the sequence number SQNHE during the generation of the authentication tuple via the HLR/AUC, the algorithm for generating the authentication tuple as well as the algorithm for generating the AUTS, please refer to the relevant protocols of 3GPP, and because they are the prior art, they will not be described in detail again here.

According to the aforementioned implementation or embodiments, the terminal and the HLR/AUC may generate the new authentication key according to a well-rounded digest algorithm, for which please refer to the book *Application Cryptography* or related algorithm papers or reports. However, when a new key is generated, the algorithm mentioned in the 3GPP protocols may be employed, which generates the cipher key CK or integrity key IK with the random challenge RAND and the authentication key KI.

Apparently, the method for updating the key according to the invention may also be used to update other keys of the terminal, rather than limited to the authentication key.

In addition, the invention provides a device for updating a key, which includes:

a first unit, set on the network for assigning a predetermined value to the authentication management field when a key needs to be updated, generating a corresponding authentication tuple, and generating a new authentication key; and a second unit, set on the network for sending corresponding parameters in the authentication tuple to a terminal.

The device for updating a key may further include a third unit, which is set on the network for generating the new authentication tuple with the new authentication key.

The invention provides another device for updating a key which is set on a terminal, comprising:

a first unit, for determining whether the authentication for the network is passed and determining whether the authentication management field in corresponding parameters is a predetermined value, after the corresponding parameters from the network are received;

a second unit, for generating a new authentication key corresponding to the network when the authentication for the network is passed and the authentication management field in the corresponding parameters is with the predetermined value.

Additionally, the device may further include a third unit, for sending a message about successful update of the key to the network after the new authentication key is generated.

It should be noted that the aforementioned are only the preferred embodiments, which are not intended to limit the present invention. Accordingly, various variations and modifications may be made without departing from the spirit or scope of the invention as defined by the appended claims and their equivalents.

The invention claimed is:

1. A method for updating a key in a wireless network, the method comprising:

generating, at a network side, a first authentication vector according to a first authentication key stored in the network side in a preset manner, wherein a predetermined value is assigned to an authentication management field contained in the first authentication vector;

generating a new authentication key at the network side according to the first authentication key stored in the network side and a first parameter;

updating the first authentication key with the new authentication key generated at the network side;

sending parameters in the first authentication vector to a terminal, wherein the parameters comprise the first parameter for generating the new authentication key and a second parameter containing the authentication management field;

generating, by the terminal and according to the first parameter and a second authentication key stored in the terminal, a new authentication key corresponding to the new authentication key generated at the network side when the parameters are received and it is determined that the authentication for the network side is passed and the authentication management field in the second parameter takes the predetermined value;

updating the second authentication key with the new authentication key generated by the terminal;

sending, by the terminal, a message indicating successful update of an authentication key of the terminal to the network side after the new authentication key is generated; and generating, at the network side, a new authentication vector according to the new authentication key generated at the network side in the preset manner when the message indicating successful update of the authentication key of the terminal sent by the terminal is received at the network side;

wherein a value of the first authentication key is consistent with a value of the second authentication key and the first authentication vector is different from the new authentication vector generated by the network side; and wherein sending the message indicating successful update of the authentication key of the terminal comprises returning a synchronization request message to the network side, in which a sequence number takes a predetermined value.

2. The method according to claim 1, wherein sending the message indicating successful update of the authentication key of the terminal is implemented via short message, Unstructured Supplementary Data Service and/or Over-the-Air.

3. The method according to claim 1, wherein generating, at the network side, the new authentication vector according to the new authentication key generated at the network side in the preset manner comprises:

determining, at the network side, whether a location of the terminal is updated before the message indicating successful update of the key sent by the terminal is received at the network side; and generating, at the network side, the new authentication vector according to the new authentication key generated at the network side in the preset manner if the location is updated; otherwise, generating the new authentication vector without using the new authentication key.

4. The method according to claim 1, wherein after generating, at the network side, the new authentication vector according to the new authentication key generated at the network side in the preset manner, the method further comprises:

determining, at the network side, whether an old authentication vector still exists at the network side when the new authentication vector with the new authentication key is generated at the network side, and deleting the old authentication vector when the old authentication vector still exists.

5. The method according to claim 1, wherein the method further comprises:

sending, by the terminal, a request for updating an authentication key to the network side before assigning the predetermined value to the authentication management field at the network side.

6. The method according to claim 1, wherein the authentication vector comprises a random challenge, an expected response, a cipher key, an integrity key and an authentication token.

7. The method according to claim 1, further comprising:

sending, by the terminal, a message indicating successful update of an authentication key of the terminal to the network side after the new authentication key is generated by the terminal, wherein generating a new authentication key at the network side comprises:

generating the new authentication key at the network side in response to receiving the message indicating successful update of the authentication key of the terminal.

8. The method according to claim 2, wherein sending the message indicating successful update of the authentication key of the terminal is implemented via short message.

9. The method according to claim 2, wherein sending the message indicating successful update of the authentication key of the terminal is implemented via Unstructured Supplementary Data Service.

10. The method according to claim 2, wherein sending the message indicating successful update of the authentication key of the terminal is implemented via Over-the-Air.

11. The method according to claim 5, wherein sending the request for updating the authentication key is implemented by sending a synchronization request message to the network side, in which a sequence number takes a predetermined value.

12. The method according to claim 5, wherein sending the synchronization request message to the network side implemented via short message.

13. The method according to claim 5, wherein sending the synchronization request message to the network side implemented via Unstructured Supplementary Data Service.

14. The method according to claim 5, wherein sending the synchronization request message to the network side implemented via Over-the-Air.

15. The method according to claim 6, wherein the random challenge and authentication token are generated during the generation of the corresponding authentication vector.

16. The method according to claim 6, the random challenge and authentication token, together with any one or more of the expected response, cipher key and integrity key are generated during the generation of the corresponding authentication vector.

* * * * *